United States Patent
Floan et al.

(10) Patent No.: US 9,511,307 B2
(45) Date of Patent: Dec. 6, 2016

(54) EXTRACTOR

(71) Applicant: Crown Iron Works Company, Roseville, MN (US)

(72) Inventors: Benjamin W. Floan, Andover, MN (US); George E. Anderson, Champlin, MN (US)

(73) Assignee: CROWN IRON WORKS COMPANY, Roseville, MN (US)

(*) Notice: Subject to any disclaimer, the term of this patent is extended or adjusted under 35 U.S.C. 154(b) by 0 days.

(21) Appl. No.: 14/382,488

(22) PCT Filed: Apr. 19, 2013

(86) PCT No.: PCT/US2013/037424
§ 371 (c)(1),
(2) Date: Sep. 2, 2014

(87) PCT Pub. No.: WO2013/159024
PCT Pub. Date: Oct. 24, 2013

(65) Prior Publication Data
US 2015/0132198 A1   May 14, 2015

Related U.S. Application Data

(60) Provisional application No. 61/635,679, filed on Apr. 19, 2012.

(51) Int. Cl.
*B01D 11/02* (2006.01)
*C11B 1/10* (2006.01)

(52) U.S. Cl.
CPC ......... *B01D 11/0269* (2013.01); *B01D 11/023* (2013.01); *C11B 1/10* (2013.01)

(58) Field of Classification Search
CPC ... B01D 11/0269; B01D 11/023; C11B 1/10; B29L 2031/7092
See application file for complete search history.

(56) References Cited

U.S. PATENT DOCUMENTS

| | | | |
|---|---|---|---|
| 2,249,792 A * | 7/1941 | Skinner | A23B 7/005 134/10 |
| 3,434,933 A | 3/1969 | Mansfield | |
| 3,803,879 A * | 4/1974 | Holm | D06B 9/04 68/18 C |
| 3,856,474 A | 12/1974 | Pittman et al. | |
| 4,198,725 A * | 4/1980 | Trutzschler | D01G 9/08 15/309.2 |
| 4,608,122 A | 8/1986 | Klein et al. | |
| 4,873,103 A * | 10/1989 | Cordera | A21C 9/04 426/233 |

(Continued)

FOREIGN PATENT DOCUMENTS

| FR | 2578867 A1 | 9/1986 |
|---|---|---|
| GB | 459587 A | 10/1935 |

OTHER PUBLICATIONS

Copenheaver, Blaine R., PCT International Search Report and Written Opinion of the International Searching Authority, PCT Application No. PCT/US2013/037424, Apr. 19, 2013.

(Continued)

*Primary Examiner* — Regina M Yoo
(74) *Attorney, Agent, or Firm* — Fredrikson & Byron, P.A.

(57) ABSTRACT

An extractor which provides significant features over structures known in the prior art. The present improved structure employs nozzles which eject a jet of fluid upwardly into a granular or flake product being conveyed on a transfer conveyor.

12 Claims, 7 Drawing Sheets

(56) References Cited

U.S. PATENT DOCUMENTS

| | | | |
|---|---|---|---|
| 5,408,924 A | 4/1995 | Arendt et al. | |
| 5,770,082 A | 6/1998 | Anderson | |
| 5,829,691 A * | 11/1998 | Gaudin | B09C 1/02 241/46.01 |
| 6,101,738 A * | 8/2000 | Gleason | F26B 11/028 34/216 |
| 6,846,061 B2 * | 1/2005 | Nakashima | B41J 2/16526 347/22 |
| 2004/0113973 A1 * | 6/2004 | Nakashima | B41J 2/16526 347/35 |
| 2006/0090366 A1 | 5/2006 | Williamson et al. | |

OTHER PUBLICATIONS

Yuen, Henry, PCT International Preliminary Report on Patentability, PCT Application No. PCT/US2013/037424, Jul. 11, 2014.

Garcia Alonso, Nuria, Supplementary European Search Report under Art. 153(7) for EP Appl. No. 13778807.1, May 26, 2015.

* cited by examiner

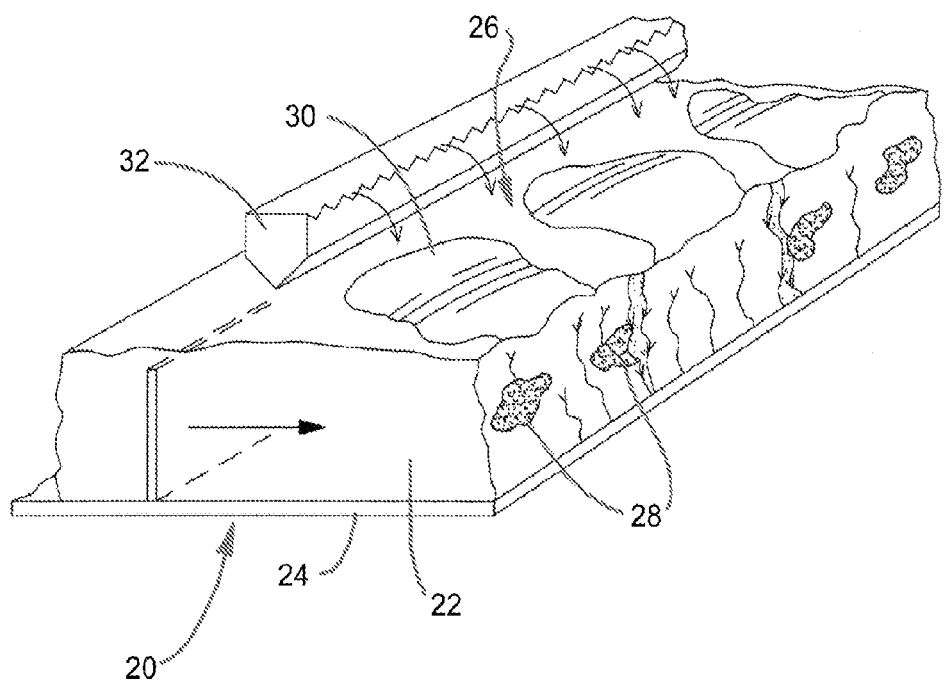
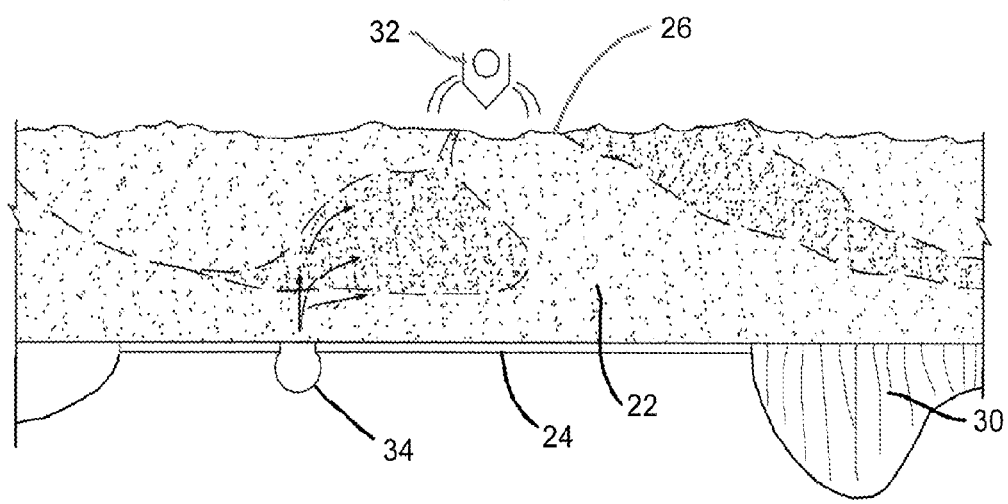

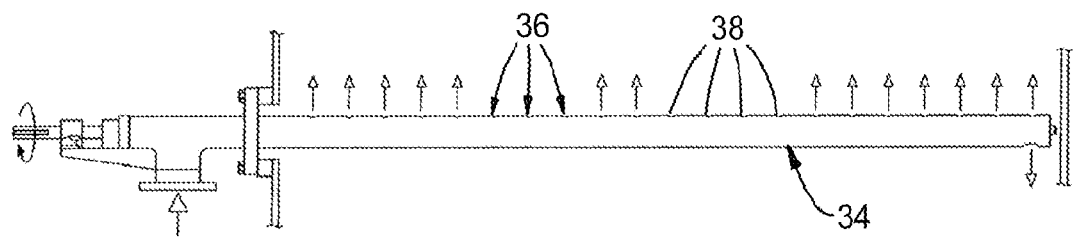
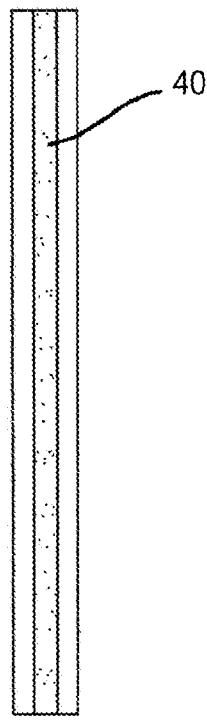
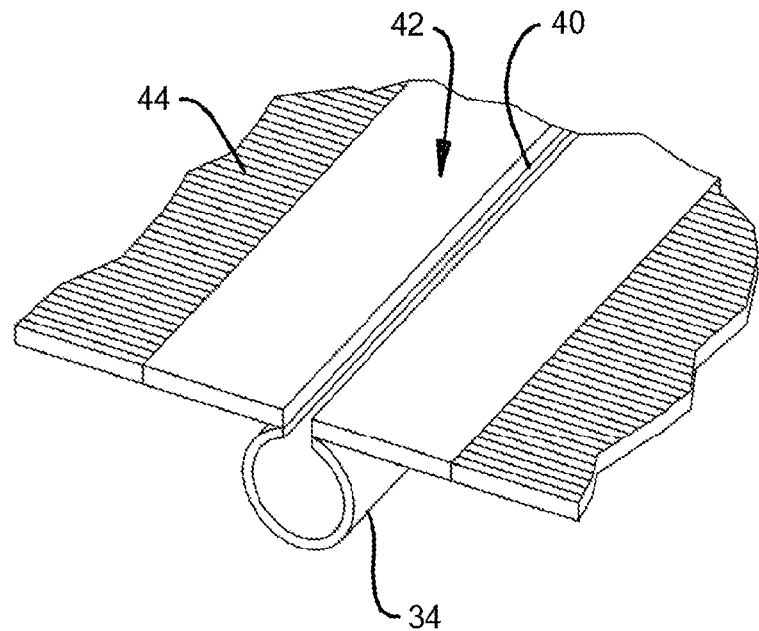

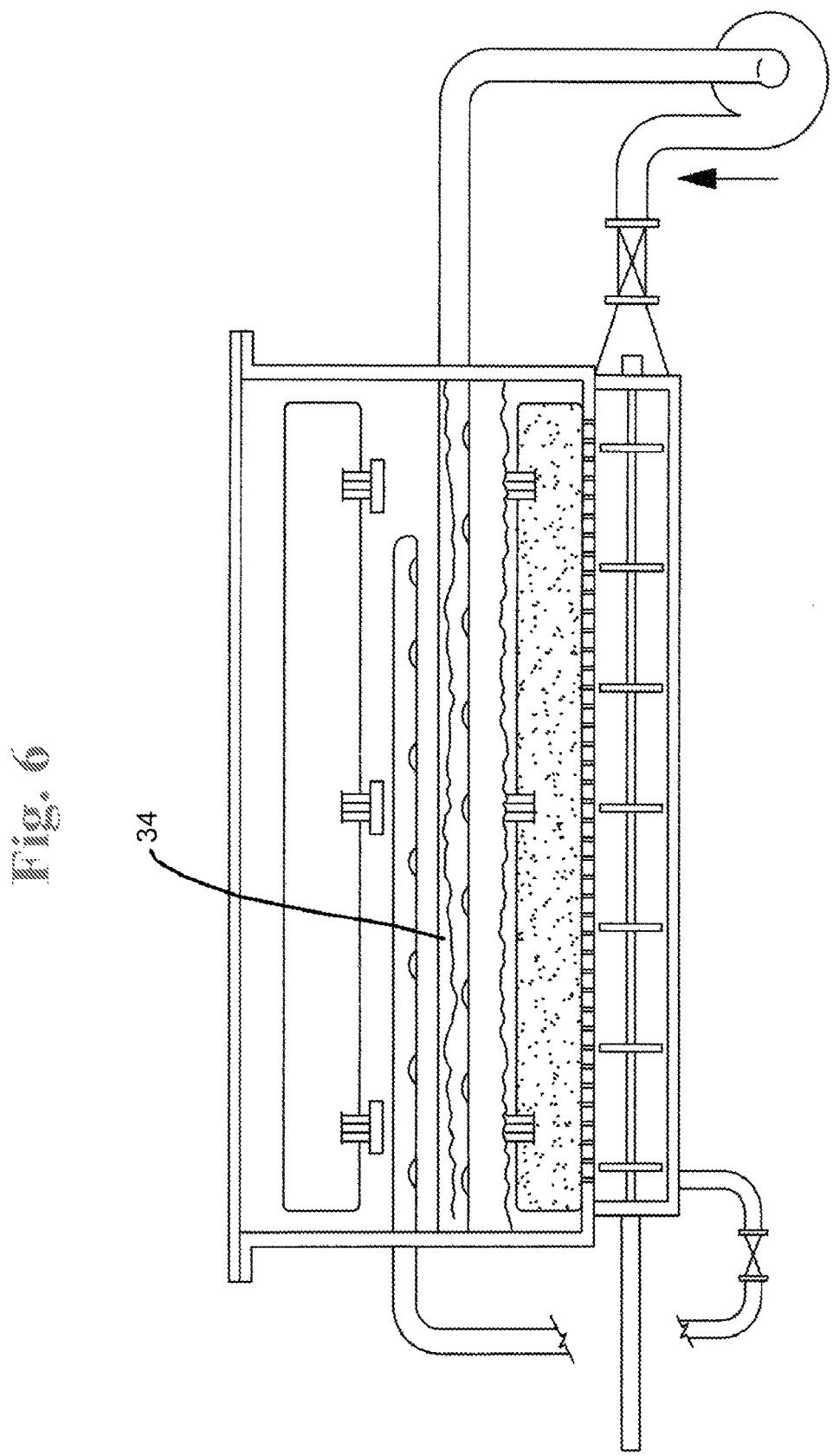

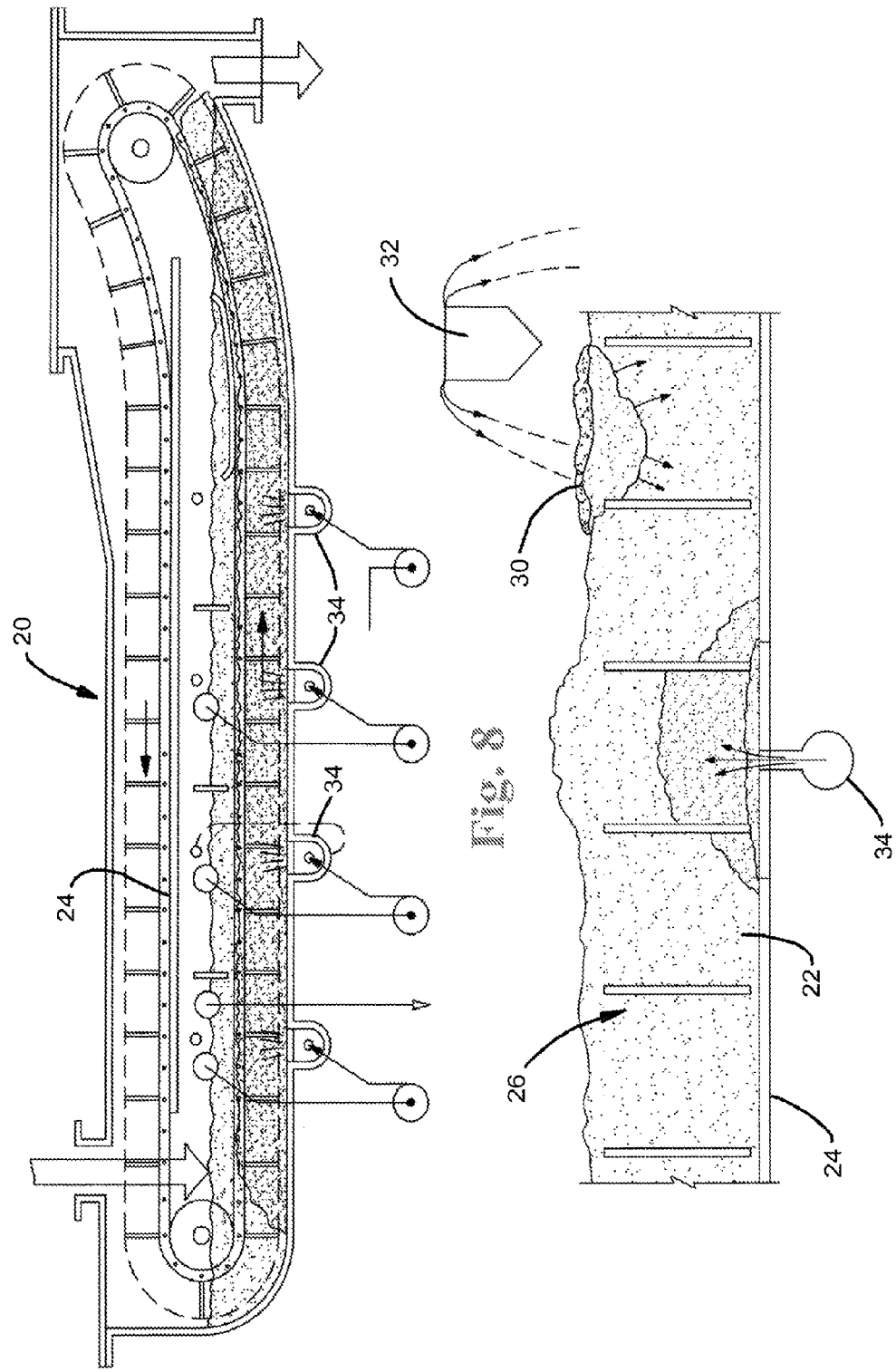

EXTRACTOR

CROSS-REFERENCE TO RELATED APPLICATIONS

This is a regular application filed under 35 U.S.C. §111(a) claiming priority, under 35 U.S.C. §119(e)(1), of provisional application Ser. No. 61/635,679, previously filed Apr. 19, 2012, under 35 U.S.C. §111(b).

TECHNICAL FIELD

The present invention deals with apparatus used in separating, for example, solvent from a granular material with which the granular material is impregnated.

BACKGROUND OF THE INVENTION

Extractors, as discussed hereinafter, have been used in industry for many years. They are particularly applicable for use in processing agricultural products. Granular or flake material is treated with a solvent so that some amount of a component impregnating the granular or flake material may be dissolved by the solvent in solution and separated. An example of a product an extractor is utilized to process is soybean flakes. Such flakes are typically treated with a solvent such as hexane. The solvent dissolves and separates oil in the flakes.

Another example of a product processed by an extractor is soy protein concentrate. De-fatted soybean flakes are washed with alcohol so as to dissolve and separate carbohydrates in the flakes. A product of this process is carbohydrates. A material with a high concentration of protein is, thereby, produced.

In extractors known in the prior art, the granular or flake material being processed is transported from an inlet of the extractor to an outlet thereof. Transportation is provided by structures such as a drag conveyor. While solvent is poured over a bed of the material, the material is transported from the inlet to the outlet. The efficiency of the extractor is a measure of the rate at which the solvent is able to effectively remove the targeted component from the material.

The bed of material being conveyed is essentially a porous medium. Consequently, as solvent is repeatedly poured onto the top of the bed, it will wash through the bed, make contact with the material and drain out through the screen which supports the material. In an application previously discussed, the hexane wash drains through a slurry of oil-impregnated material. The oil is, thereby, removed from the soybean material.

The geometry of the material bed is not, however, uniform. At various locations within the bed, variation in efficiency will be realized. Some locations within the bed are more open, and some locations are more packed. This can be true for various types of granular or flake material. Consequently, in zones that are more open, there will be a greater flow of solvent than in other locations. In locations where there is less solvent flow, greater extraction time will be necessary.

It is to these dictates and shortcomings of the prior art that the present invention is directed. It is a novel extractor construction that functions to solve problems of the prior art.

SUMMARY OF THE INVENTION

The present invention is an extractor weir which uses upward flow. In one embodiment, it employs a plurality of openings which function as jets. In some embodiments, the openings can be defined at desired locations. If advantageous, they can be placed at locations in a desired array. The openings are typically positioned substantially at the same level as the conveyor screen or slightly below the screen. Miscella or solvent is injected upward into the bed on the conveyor. Such a construction enables solvent to be delivered to areas of the bed that may not be washed well by a typical extractor as known in the prior art.

Upward flow from the weir can also accomplish rearrangement of the bed. Accessibility of areas of the bed typically not reached by the top-down washing can be accomplished. It will be seen then that the present invention more efficiently accomplishes the goal of maximizing solvent contact with the granular or flake material.

Definition of a zone surrounding a weir where downwards drainage is controlled so as to allow increased upward penetration of solvent into the material bed can be employed. As flow emanates from upwardly directed nozzles, it will disperse into the material bed. Effective height of the solvent penetration from the upward flow weir is a function of drainage adjacent to the weir outlets, the rate and pressure of flow out of the weir and the porosity of the material bed.

In some embodiments, there may be no bottom screens. In such embodiments, there is no downward drainage, and all miscella or solvent travels upwards and out of the top of the bed in each stage or volume of extraction. Since the miscella flowing through the weirs will most certainly have particulate material present therein, it is desirable to consider how to keep heavy, solid material in suspension in order to prevent excessive buildup in low velocity regions. Steps could be taken to keep weir outlets from plugging. As one example, the goal of maintaining weir outlets in an unplugged configuration can efficiently be accomplished by employing a rotor or agitator within a distributor pipe. Such a structure fosters movement of the mixture so that it may flow out of the weir.

It will be understood that this disclosure, in many respects, is only illustrative. Changes may be made in details, particularly in matters of shape, size, material, and arrangement of parts without exceeding the scope of the invention.

BRIEF DESCRIPTION OF THE DRAWING FIGURES

FIG. 1 is a perspective view of a portion of an extractor as known in the prior art;

FIG. 2 is a side section of a portion of an extractor in accordance with the present invention;

FIG. 3 is a side elevation view of a manifold as used in the present invention;

FIG. 4 is a top plan view of a manifold in accordance with the present invention;

FIG. 5 is a perspective view of a portion of a conveyor having a slit in alignment with a slit in the manifold in accordance with the present invention;

FIG. 6 is an end sectional view of an extractor in accordance with the present invention;

FIG. 7 is a side sectional view of an extractor employing multiple manifolds;

FIG. 8 is a side sectional view of a portion of the extractor in accordance with the present invention;

DETAILED DESCRIPTION OF THE INVENTION

Figure 9:
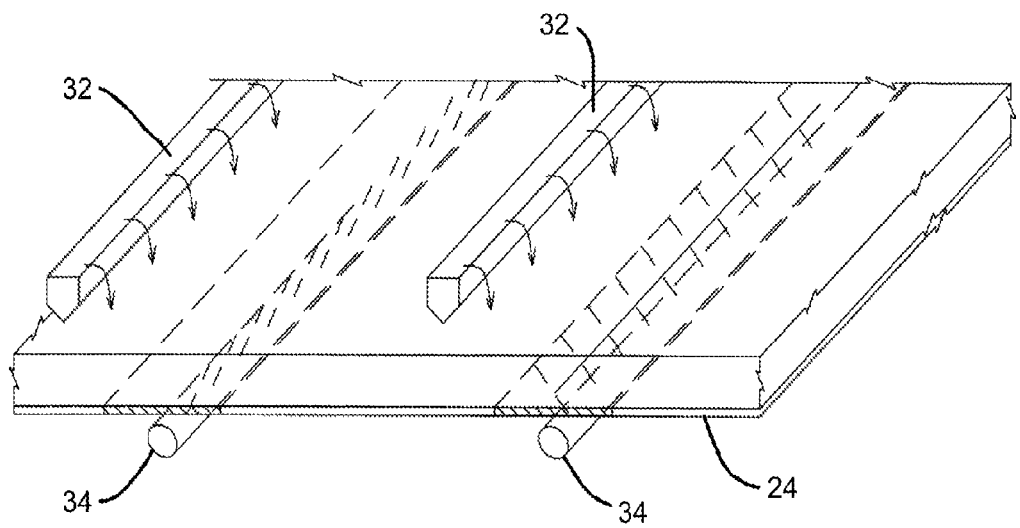
FIG. 9 is a perspective view of a portion of a conveyor with which the present invention is used.
Figure 10:
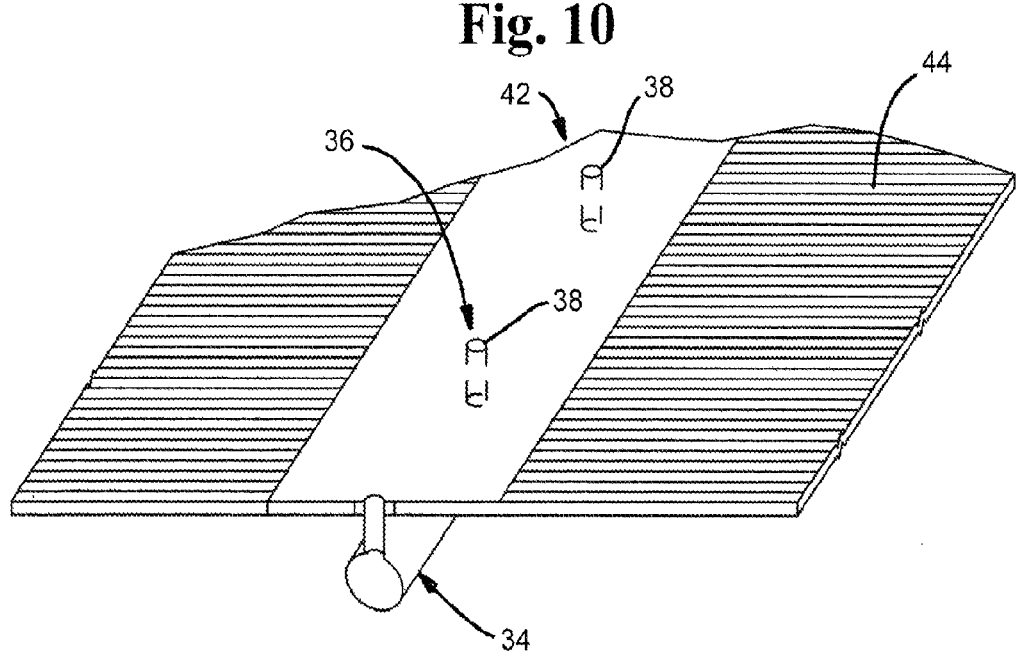
FIG. 10 is a view, similar to FIG. 9, employing an alternative embodiment of a manifold.

Referring now to the drawing figures wherein like reference numerals denote like elements throughout the several views, FIG. 1 illustrates a prior art extractor section 20 which highlights certain problems existent in the prior art. Because of the consistency of the material 22 being processed, material 22 being transferred by conveyor 24 tends to achieve a non-uniform depth of the bed 26 of material 22. Illustrated in FIG. 1, porous sections 28 of the bed 26 are typically formed. Such areas are open and facilitate solvent flowing easily and draining through such porous sections 44. Further, as a result of down flow of solvent through small areas of the bed 26, clumps 36 of the material being processed can form. Further, pooling of solvent in the upper surface of the material bed 26, as seen at 30, can result as solvent is sprinkled from a weir 32 onto the bed 26 of material 22.

FIG. 2 illustrates in side section the disposition of processed material 22 during treatment by a structure in accordance with the present invention. Of particular interest is a plenum, or manifold 34, which is in fluid communication with a reservoir of fluid for ejection through nozzles 36 (not shown in FIG. 2) formed in the upper portion of the manifold 34. FIG. 3 better illustrates orifices 38 which serve as the nozzles 36. The orifices 38 are shown as being generally linearly aligned and extending in sequence across a width of the conveyor means 24.

FIGS. 4 and 5 illustrate an embodiment where a slot 40 extends substantially fully across the width of the conveyor 24. FIG. 5 in particular shows a blank section 42, alternating with porous segments 44 of the conveyor 24 has the slot 40 formed therein. The slot 40 is more efficiently formed in the blank segment 42 rather than the porous segments 44 of the conveyor means.

Figure 11:
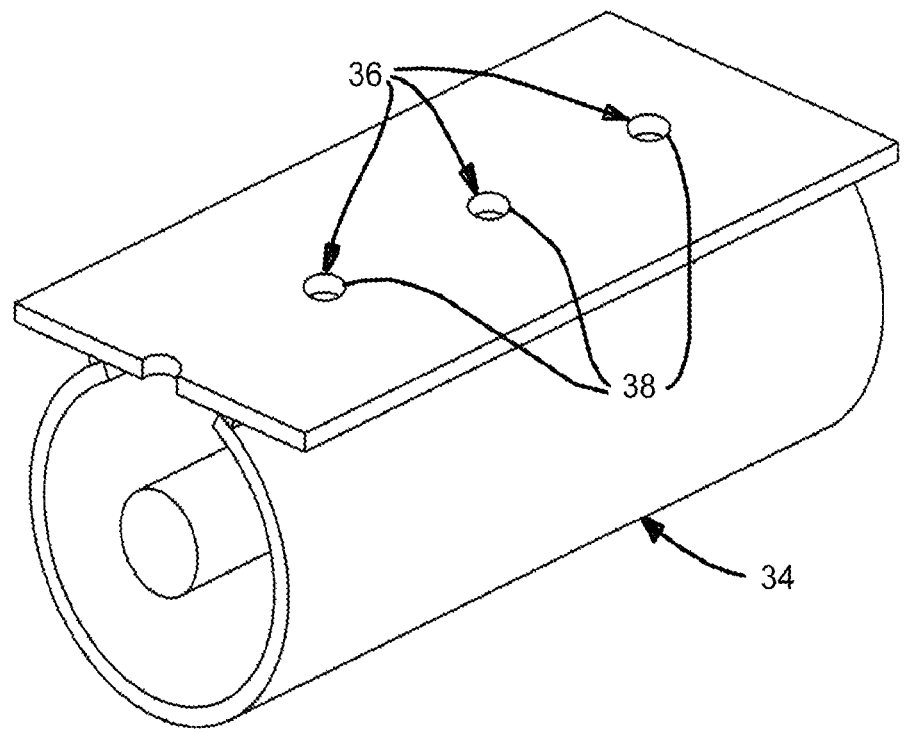
FIG. 11 is an enlarged sectional view of a portion of an alternative embodiment of a manifold.
Figure 12:
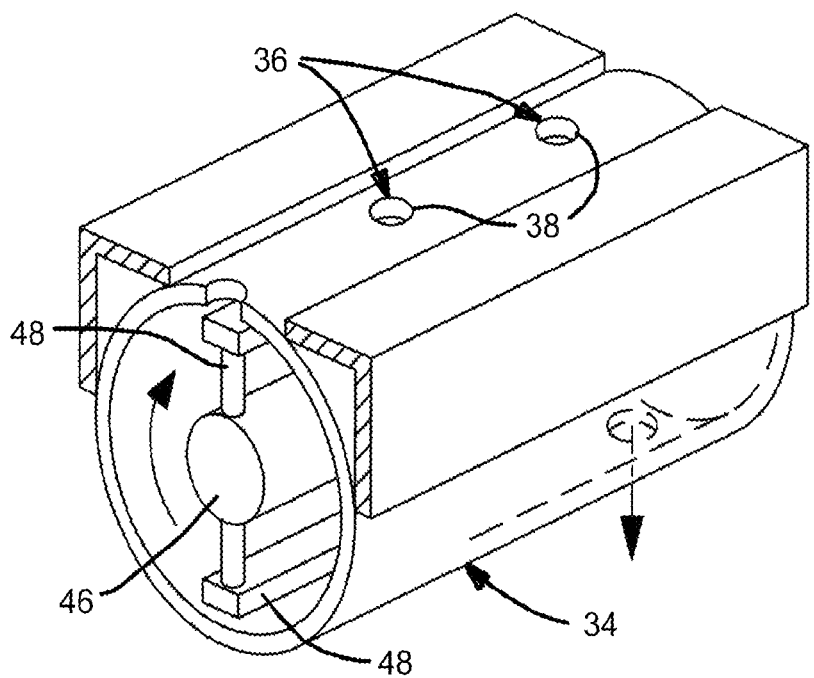
FIG. 12 is a view, similar to FIG. 11, having an agitator installed therein.
Figure 13:
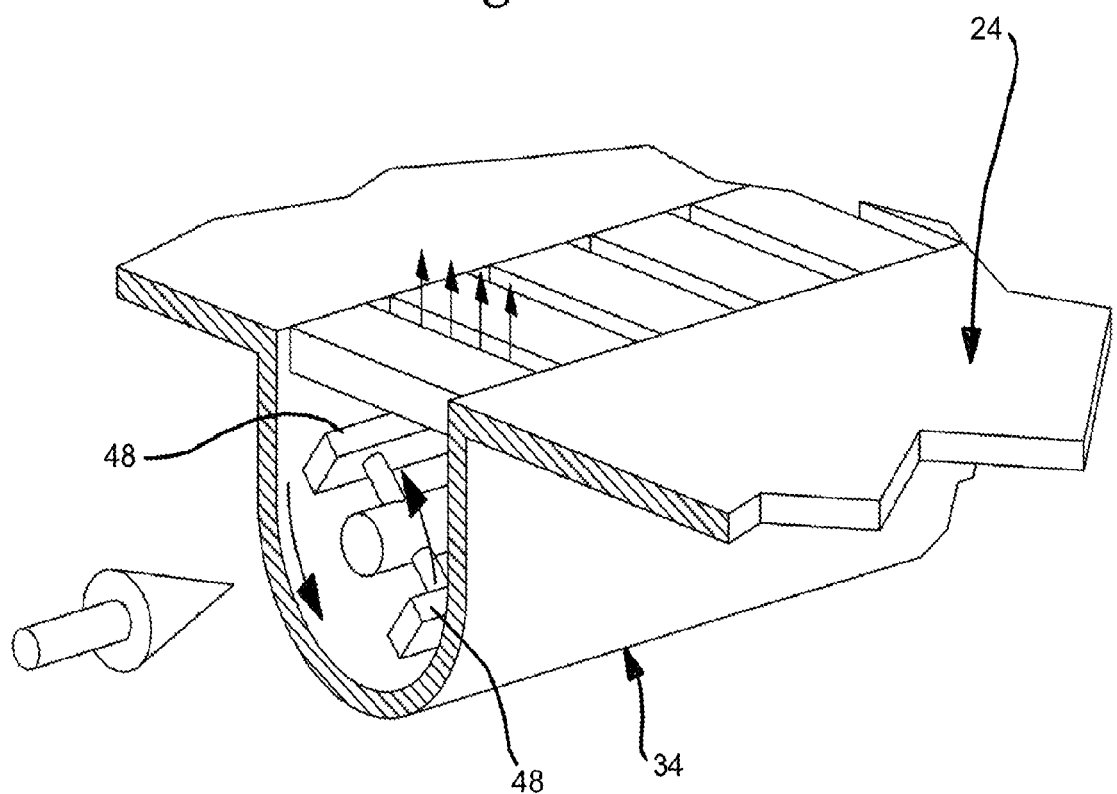
FIG. 13 is a view similar to FIG. 12.

FIGS. 11-13 illustrate different shaped manifolds 34 and use of agitation means 46. Those three figures illustrate a shaft 48 mounted centrally within the manifold 34. The shaft 48 is adapted to be disposed centrally within the manifold 34 and not be obstructive of the agitation paddles 48.

As will be able to be seen in view of this disclosure, having upper ejecting nozzles 36 provides a significant advantage over extractors known in the prior art. It will be understood that the breadth of the invention is described in the claims.

What is claimed is:

1. An extractor, comprising:
    a porous screen on which material to be processed is deposited for transmission along an axis; and
    a fluid passage formed through the porous screen and over a plenum mounted to an underside of the porous screen, the plenum being in fluid communication with a reservoir of fluid and configured to eject the fluid upwardly through the fluid passage and into the material to be processed on an upper surface of the porous screen, thereby influencing a texture of the material to be processed.

2. The extractor in accordance with claim 1 wherein said fluid passage comprises a slit extending substantially a full width of said porous screen in a disposition generally perpendicular to said axis.

3. The extractor in accordance with claim 2 further comprising agitation means mounted within said plenum.

4. The extractor of claim 1, wherein said porous screen comprises a blank section and said fluid passage comprises a slit extending generally perpendicular to said axis, said plenum being positioned to eject the fluid upwardly through the slit and into the porous screen and material to be processed deposited thereon.

5. An extractor, comprising:
    conveyor means on which granular or flake material is deposited for transmission from a first end to a second end, said conveyor means comprising alternating segments of porous material and blank sections; and
    a plurality of nozzles positioned in each blank section of said conveyor means, each of said plurality of nozzles being configured to direct a jet of fluid upwardly into the granular or flake material, thereby causing the jet of liquid to disperse into of the granular or flake material and influence a contour of the granular or flake material.

6. The extractor in accordance with claim 5 wherein said conveyor means is porous.

7. The extractor in accordance with claim 5 further comprising a manifold mounted to an underside of each blank section of said conveyor means, said manifold being in fluid communication with a plurality of generally linearly aligned orifices formed therein to thereby provide the plurality of nozzles.

8. The extractor in accordance with claim 7 further comprising a source of fluid in fluid communication with said manifold to deliver fluid to said manifold.

9. The extractor in accordance with claim 8 wherein said manifold comprises a pipe, and wherein said plurality of generally linearly aligned orifices are aligned along a first axis extending generally transverse to said run of said conveyor means.

10. The extractor in accordance with claim 9 further comprising agitation means mounted within a pipe manifold.

11. The extractor in accordance with claim 10 wherein said agitation means is configured to rotate about a second axis substantially parallel to said first axis.

12. The extractor of claim 5, wherein said conveyor means comprises a screen.

* * * * *